US005247609A

United States Patent [19]

Joba

[11] Patent Number: 5,247,609

[45] Date of Patent: Sep. 21, 1993

[54] LINE DENSITY CONTROL FOR PLOTTERS

[75] Inventor: Lawrence R. Joba, Santa Cruz, Calif.

[73] Assignee: Thermo Separation Products (California) Inc., Fremont, Calif.

[21] Appl. No.: 900,554

[22] Filed: Jun. 18, 1992

Related U.S. Application Data

[63] Continuation of Ser. No. 279,904, Dec. 2, 1988, abandoned.

[51] Int. Cl.[5] .............. G06F 15/66

[52] U.S. Cl. .............. 395/128; 395/107; 395/143; 400/83; 400/121

[58] Field of Search .............. 395/140, 141, 142, 128, 395/107, 143; 340/706, 747, 750; 400/121, 83

[56] References Cited

U.S. PATENT DOCUMENTS

| | | | |
|---|---|---|---|
| 4,202,267 | 5/1980 | Heinzl et al. | 101/364 |
| 4,208,139 | 6/1980 | Fujimoto et al. | 400/126 |
| 4,417,256 | 11/1983 | Fillmore et al. | 346/75 |
| 4,491,906 | 1/1985 | Kishi et al. | 364/191 |
| 4,533,928 | 8/1985 | Sugiura et al. | 346/140 R |
| 4,540,997 | 9/1985 | Biggs et al. | 346/140 R |
| 4,543,590 | 9/1985 | Tazaki et al. | 346/140 R |
| 4,567,570 | 1/1986 | Peer | 364/900 |
| 4,622,560 | 11/1986 | Withoos | 346/1.1 |
| 4,629,342 | 12/1986 | Futaki | 400/121 |
| 4,639,738 | 1/1987 | Young et al. | 346/75 |
| 4,651,287 | 3/1987 | Tsao | 364/519 |
| 4,654,805 | 3/1987 | Shoup, II | 364/520 |
| 4,698,779 | 10/1987 | Holden et al. | 364/520 |
| 4,716,421 | 12/1987 | Ozawa et al. | 346/140 R |
| 4,725,978 | 2/1988 | Fujioka | 364/900 |
| 4,729,108 | 3/1988 | Uchiyama | 364/520 |
| 4,737,041 | 4/1988 | Nakayama | 400/121 |
| 4,758,849 | 7/1988 | Piatt et al. | 346/140 R |
| 4,764,880 | 8/1988 | Pearl | 364/519 |
| 4,788,861 | 12/1988 | Lichti | 73/304 R |
| 4,963,927 | 10/1990 | Ishihara | 355/207 |

FOREIGN PATENT DOCUMENTS

| | | |
|---|---|---|
| 0104628 | of 0000 | European Pat. Off. . |
| 55-156074 | 12/1980 | Japan . |
| 58-153665 | 9/1983 | Japan . |
| 59-156783 | 9/1984 | Japan . |
| 60-15169 | 1/1985 | Japan . |
| 60-129266 | 7/1985 | Japan . |
| 61-199954 | 9/1986 | Japan . |
| 2000344 | 1/1979 | United Kingdom . |
| 2119549 | 11/1983 | United Kingdom . |

OTHER PUBLICATIONS

Hewlett Packard Thermal Ink-Jet Print Cartridge Designer's Guide, Second Edition.

Hewlett Packard Jounal, May 1985 "Thermal Ink-Jet Printhead".

"Overpaint Function For Color Printer" IBM Technical Disclosure Bulletin, vol. 29, No. 9, p. 3861, Feb. 1987.

*Primary Examiner*—Phu K. Nguyen
*Attorney, Agent, or Firm*—Killworth, Gottman, Hagan & Schaeff

[57] ABSTRACT

The conventional computer program in the microcontroller of an ink jet printer-plotter is modified so as to plot a line of constant average dot density along its length, regardless of the orientation of various segments making up the plotted line. This modification provides the benefit of consistent line density for all plotted lines.

22 Claims, 8 Drawing Sheets

FIG-4A

GET DOTS:

Purpose: Set up Ink Dot pattern for next step

The NEXTDOTS variable is first cleared to zero. If the OFFPAPER flag is on (signifying position before physical start of paper), the routine is exited. If the pen is off, then the routine is exited.

DFLOW is added to DOT_RATIO. If there is no overflow of DOT_RATIO, then the routine is exited. If there is overflow, the 128 is subtracted from DOT_RATIO.

If Double Dot Flag in DDENSE is on, then get the pattern for dot # DOT_SELECT - 1 by calling ONEDOT and put it in the high byte of NEXTDOTS.

Call ONEDOT to get the pattern for dot # DOT_SELECT and put it in the low byte of NEXTDOTS. Call ADDDOTS to add to DOT_TOTAL, check for DOT_TOTAL greater than 4095 and set MOREDOTS flag if it is.

Called by: NEXTPLOT

Subroutines Called: ONEDOT (2), ADDDOTS

Input Variables: DOT_RATIO, DFLOW, DDENSE, DOT_SELECT, Flags (OFFPAPER, APLFLAG, PEN)

Changed Variables: NEXTDOTS, DOT_RATIO

```
        CLR     A                   Clear NEXTDOTS
        MOV     NEXTDOTS, A
        MOV     NEXTDOTS+1,A
        JB      OFFPAPER,GETDO5     If Not Off Paper, Then Do
        JNB     PEN,GETDO5          If Pen Off, Skip Ink
        MOV     A,DOT_RATIO         Dot Ratio = Dot Ratio - Dot Flow
        ADD     A,DFLOW
        MOV     DOT_RATIO,A
        JNC     GETDO5              If No Carry, Then Skip Ink
        ADD     A,#-128             Else, Dot Ratio = Dot Ratio - 128
        MOV     DOT_RATIO,A
        MOV     A,DDENSE            Carry = DDENSE.3 (Double Dot Flag):
        MOV     C,ACC.3
        MOV     A,DOT_SELECT        ACC = Dot Select
        MOV     B,#1                Dot Count = 1
        JNC     GETDO2              If Double Dot Flag
        PUSH    ACC                 Save ACC
        INC     B                   Dot Count = 2
        DEC     A                   ACC = Lower Dot Location
        CALL    ONEDOT              Get Dot (ACC)
        MOV     NEXTDOTS,A          Next Dot = Dot (ACC)
        POP     ACC                 Restore Dot Position to ACC
GETDO2:
        CALL    ONEDOT              Get Dot (ACC)
        MOV     NEXTDOTS+1,A        Next Dot + 1 = Dot (ACC)
        MOV     A,B                 ACC = Dot Count
        CALL    ADDDOTS             Count Dots
GETDO5:
        RET                         And Return
```

FIG-4B

GETDF: Get Dot Flow Count

Purpose: Calculate DF, the dot flow vs. step ratio

This routine calculates the dot flow rate. A value of 128 for the dot flow will result in one dot of ink output for each step taken on the major stepping axis. Since the steps are closer together on the X axis, only 56 dots are put out for each 128 steps in order to obtain maximum ink density. If taking equal steps, then the ratio of the diagonal line to the horizontal distance is about 140/128.

If the Y axis is the major axis, then the number for full plot density is obtained from table YDFTABLE. If the X axis is the major axis, then the number is obtained from table XDFTABLE. The number is then multiplied by the number from DFTABLE(DDENSE). This number is limited to a maximum value of 128.

Called by: PREPARE

Subroutines Called: none

Input Variables: RATIO,DDENSE,Flags(NFASTAX)

Changed Variables: ACC

```
        JNB     PLFLAG,GETDF8              If Plotting
        JNB     NEXTPEN,GETDF8             .and. if Pen On
        MOV     B,#140                     Then B = 140
        MOV     A,RATIO                    ACC = RATIO +1
        INC     A
        JZ      GETDF5                     If ACC .ne. 256
        SWAP    A                          Then swap nibbles of ACC
        PUSH    ACC                        Save on stack
        ANL     A,#0FH                     ACC = (RATIO+1) / 16
        JB      NFASTAX,GETDF1             If Next Fast Axis is Y
        ADD     A,#YDFTABLE-GETDF3-1       Then Point to Y DF Table
        SJMP    GETDF2
GETDF1:
        ADD     A,#XDFTABLE-GETDF3-1       Else, Point to X DF Table
GETDF2:
        PUSH    ACC                        Save Pointer on Stack
GETDF3:
        MOVC    A,@A+PC                    TEMP0 = Table (ACC)
        MOV     TEMP0,A
        POP     ACC                        Point to next table entry
        ADD     A,#GETDF3-GETDF4+1
GETDF4:
        MOVC    A,@A+PC                    B = Next entry - TEMP0
        CLR     C
        SUBB    A,TEMP0
        MOV     B,A
        POP     ACC                        ACC = 16 * MOD ((RATIO+1),16)
        ANL     A,#0F0H
        MUL     AB                         B = interpolation interval
        XCH     A,B
        MOV     C,B.7
        ADDC    A,TEMP0                    B = interpolated table value
        XCH     A,B
GETDF5:
```

FIG-4C

```
        MOV     A,DDENSE                ACC = DDENSE
        ANL     A,#7                    ACC = ACC .and. 7
        ADD     A,#DDTABLE-$-3          ACC = DD Table (ACC)
        MOVC    A,@A+PC
        INC     A                       ACC = (ACC+1)
        JZ      GETDF6                  If ACC .ne. 256 (0)
        MUL     AB                      Then, B.A = B * .ACC
GETDF6:
        XCH     A,B                     ACC = Rounded B.A
        MOV     C,B.7
        ADDC    A,#127                  If ACC .gt. 128
        JNC     GETDF7
        MOV     A,#-1                   Then, ACC = 128
GETDF7:
        ADD     A,#129
        MOV     NDFLOW,A                Next Dot Flow = ACC
        JB      PEN,GETDF8              If Pen is Off
        CLR     C                       Then Dot Ratio = - (ACC / 2)
        RRC     A
        CPL     A
        INC     A
        MOV     DOT_RATIO,A
GETDF8:
        RET                             Return

YDFTABLE:       128 / COS (ATAN ((X/256)*(HSTIN/VSTIN)))

        DB      128     0
        DB      128     16
        DB      128     32
        DB      128     48
        DB      129     64
        DB      129     80
        DB      130     96
        DB      130     112
        DB      131     128
        DB      132     144
        DB      133     160
        DB      134     176
        DB      135     192
        DB      136     208
        DB      137     224
        DB      138     240
        DB      140     256

XDFTABLE:
128 * (HSTIN/VSTIN))) / COS (ATAN ((X/256)*(VSTIN/HSTIN)))

        DB      56      0
        DB      57      16
        DB      58      32
        DB      61      48
        DB      65      64
        DB      69      80
        DB      74      96
```

FIG-4D

| | | |
|---|---|---|
| DB | 79 | 112 |
| DB | 85 | 128 |
| DB | 91 | 144 |
| DB | 98 | 160 |
| DB | 104 | 176 |
| DB | 111 | 192 |
| DB | 118 | 208 |
| DB | 125 | 224 |
| DB | 132 | 240 |
| DB | 140 | 256 |

DDTABLE:

| | | |
|---|---|---|
| DB | 11 | 0 5 dots / cm. |
| DB | 23 | 1 10 dots / cm. |
| DB | 46 | 2 20 dots / cm. |
| DB | 70 | 3 30 dots / cm. |
| DB | 93 | 4 40 dots / cm. |
| DB | 140 | 5 60 dots / cm. |
| DB | 188 | 6 80 dots / cm. |
| DB | 255 | 7 109 dots / cm. |

LINE DENSITY CONTROL FOR PLOTTERS

This application is a File Wrapper continuation of U.S. application Ser. No. 07/279,904, now abandoned.

BACKGROUND OF THE INVENTION

1. Field of the Invention

This invention relates to a method of controlling the density of lines plotted by ink jet and similar plotters having printhead carriages driven by stepper motors or similar incremental means.

2. Description of the Prior Art

Ink jet printer-plotters, as shown in FIG. 1, are known in the art. Ink jet printers are readily adapted for use as plotters, in which application the printer 10 is often used for example as a real time plotter to plot data provided by a host computer 12 or instrument. Ink jet plotters operate by expelling tiny dots of ink from an ink supply through orifices 13, etc. (called nozzles) onto a medium 14 such as a piece of paper. The ink supply and orifices are typically incorporated into a print cartridge 16, which is mounted on a carriage 18. One well known ink jet cartridge is the Hewlett Packard Thermal Ink-jet print cartridge. In a typical printer, 10, the carriage 18 moves back and forth along a guide rail 20 under the control of a conventional stepper motor 22. The paper 14 is advanced through the printer by means of a conventional paper tractor typically driven by a second stepper motor 24.

The ejection of the ink droplets, the movement of the carriage, and the advancement of the paper are conventionally all under the control of a microcontroller 26 installed in the printer 10. The microcontroller 26 typically includes ROM 28 (read only memory) which stores a computer program for operation of the printer 10.

Use of such a dot type printer whose carriage and medium are moved in steps by a stepper motor is satisfactory for printing text, but poses problems when used for plotting charts, especially when the plotting is on a real time basis.

In a typical printer 1 , the carriage stepper motor 22 moves the carriage 18 back and forth along a 7.25 inch (18.4 cm) length of the guide rail 20. The carriage stepper motor uses for example 2000 steps to move the carriage this length; 2000 steps ÷ 7.25 inch equals 276 steps per inch (2.54 cm) along the guide rail. The direction of the guide rail is designated as the Y axis. However along the other axis, designated the X axis, at right angles to the guide rail, the printer prints for example 630 dots per inch (2.54 cm).

FIG. 2A illustrates the resulting deficiency of the prior art. Line segment a—a, along the X axis (630 dots per inch), is more densely printed and thus appears darker than does line b—b which is more nearly parallel to the Y axis (276 dots per inch).

Thus, this deficiency of the prior art results in plotted lines with ink densities differing from one line segment of the plot to another, depending on the angle relative to the axes of each segment. This is undesirable, especially since other kinds of plotters are available that do not use ink dots and stepper motors and so do not have these deficiencies.

SUMMARY OF THE INVENTION

The object of the present invention is to avoid the prior art method of printing one ink dot for each step in either axis direction. The present invention controls the printer so as to eliminate the above described prior art line density differences. In the preferred embodiment, the method of the invention involves modifications to the conventional computer program in the printer microcontroller.

The present invention achieves its object by providing a substantially constant average spacing in dots per inch along each line segment, regardless of the orientation of the line segment relative to the axes. Therefore in accordance with the present invention, a fractional value is computed for the current line segment being plotted based on the angle of the line segment and the dot density requested. For each step taken on the major axis (i.e., that axis having the greater number of steps for the current line segment), the fraction is added to an accumulator. When the accumulator overflows to a positive value, a dot is printed and the accumulator is set back to a -1 fractional value. The fractional value is based on the dot density divided by the cosine of the angle of the line segment.

Line segments printed in accordance with the present invention are shown in FIG. 2B. Note that both line segments c—c and d—d are of the same density, i.e., have equal constant average dot spacing.

BRIEF DESCRIPTION OF THE DRAWINGS

FIGS. 4A, 4B, 4C and 4D show the relevant parts of the computer program in assembly language of an embodiment of the present invention.

DETAILED DESCRIPTION OF THE INVENTION

In accordance with the present invention, in one embodiment a conventional program is installed in an 8052 type microcontroller in an ink jet printer-plotter. The program includes additional subroutines to carry out the method of the present invention.

The method of the present invention in this embodiment is performed in several steps for each line segment to be plotted. First, it is necessary to determine for each line segment to be plotted in which axis (X or Y) the lesser number of steps are to be taken. Then a ratio is calculated of the number of steps to be taken in the axis with the lesser number of steps to the number of steps to be taken in the other axis. This value is stored in a variable called RATIO, as the numerator less one of a fraction having 256 as the denominator. Thus a RATIO value of 255 means that the fraction is one; a RATIO value of zero means that the fraction is 1/256.

The tangent of the angle of the line segment relative to the major axis is then calculated as being equal to (RATIO + 1/256) * (steps/inch major axis)/(steps/inch minor axis). The major axis is the axis in which the plotter takes more steps in plotting the particular line segment, and the minor axis is the other axis.

The dot flow rate to obtain the maximum line density, (i.e., the number of dots per inch) for the line segment is then calculated as being 1/cosine of the angle whose tangent was calculated above. Therefore the line density is equal to ((steps/inch for minor axis/(steps/inch of axis having a greater number of steps/inch))/cosine (arctangent ((RATIO+1/256) * (steps/inch major axis)/(steps/inch minor axis)))). In order to simplify the calculations, the trigonometric values are obtained by table lookup. This line density value is the ratio of the space between steps on the major axis to the average space between dots along the line segment vector. This line density value preferably is then multiplied by a value called DDENSE (dot density). Dot density is a value provided so as to plot darker or lighter lines. In the preferred embodiment, a choice of eight line densities is provided.

The product of line density and DDENSE is called the dot flow rate (DFLOW). This DFLOW value is added to a DOT-RATIO accumulator to determine output (i.e., printing), of individual dots; a dot is printed whenever the DOT-RATIO accumulator overflows.

Figure 1:
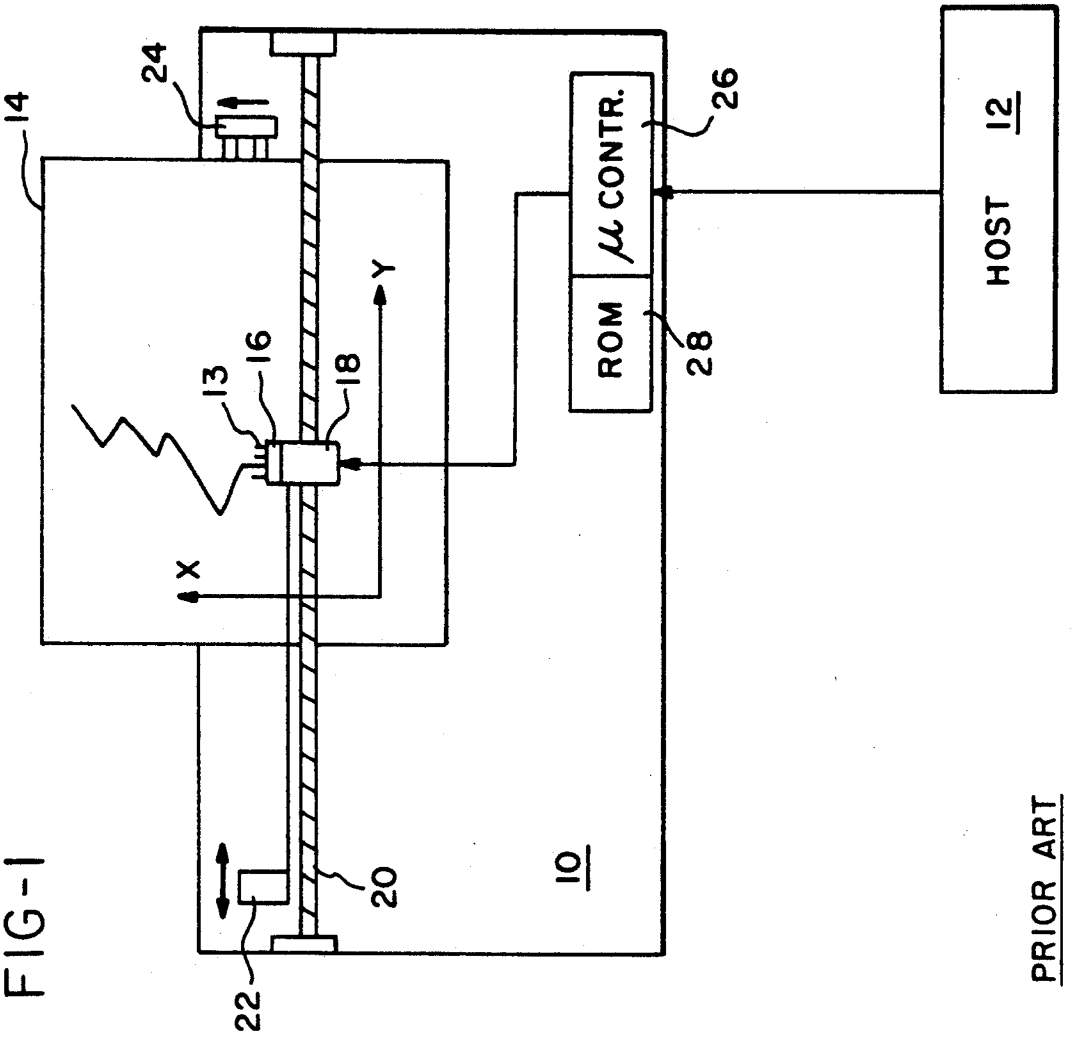
FIG. 1 depicts a printer system consistent with the prior art.
Figure 2A:
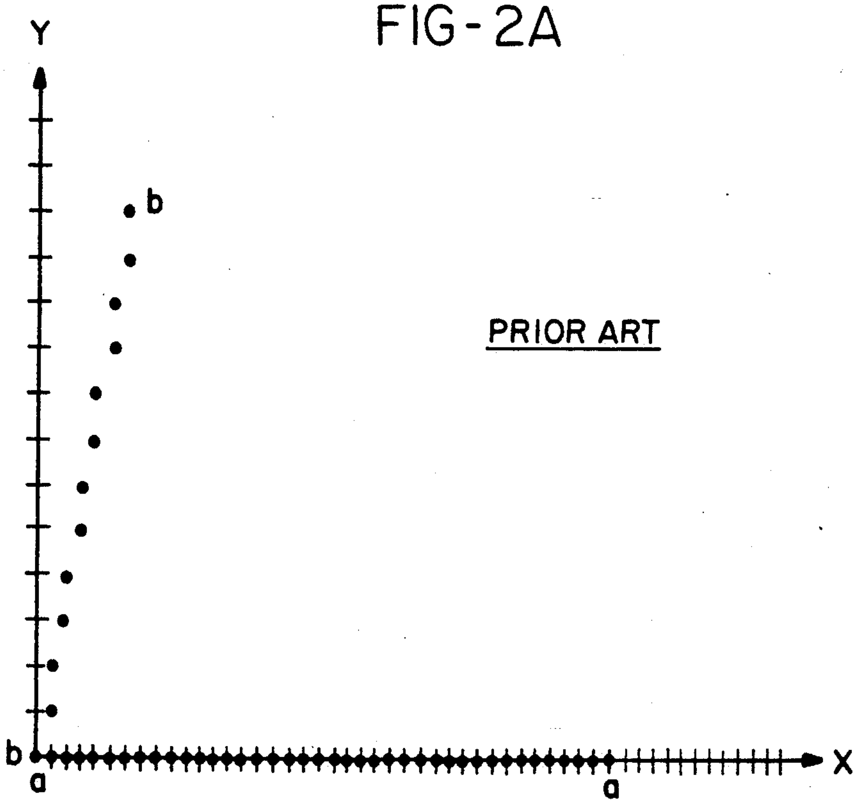
FIG. 2A and 2B show line segments plotted in accordance respectively with the prior art and with the present invention.
Figure 2B:
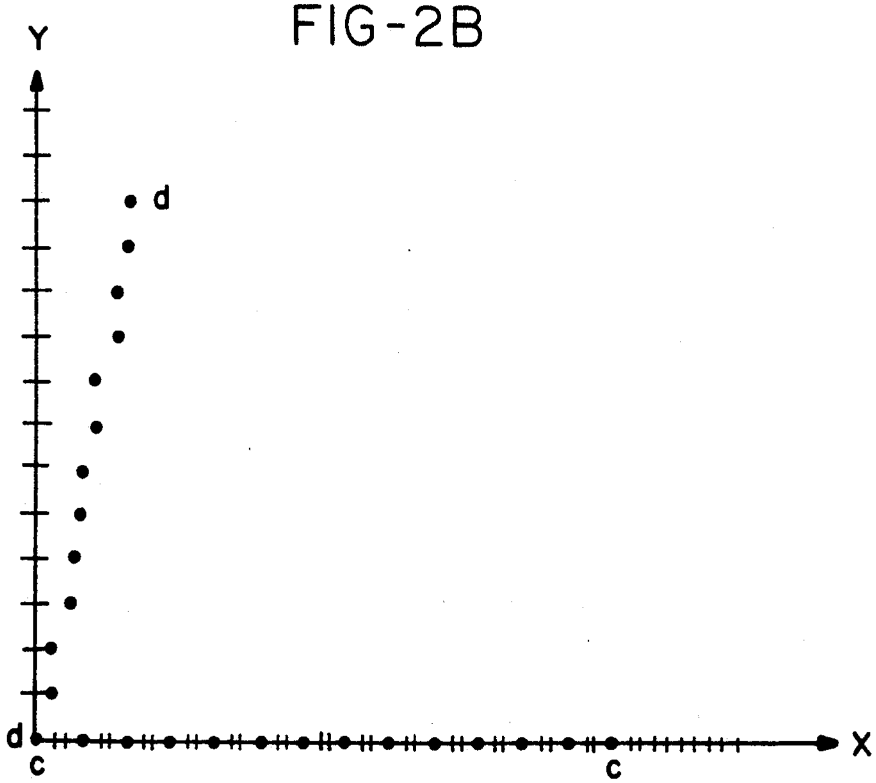
Figure 3A:
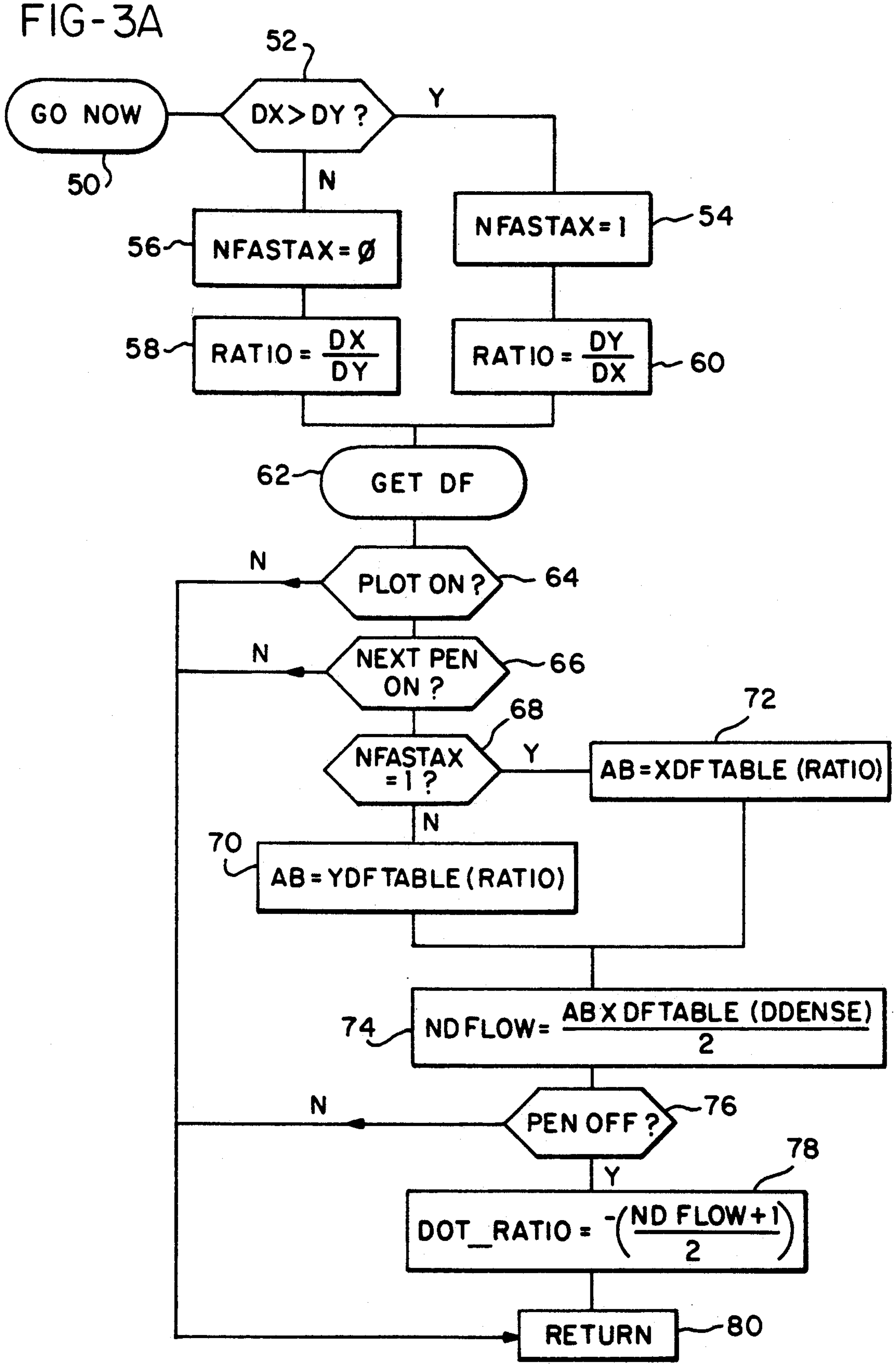
FIG. 3A and 3B depict an embodiment of the present invention in flowchart format.
Figure 3B:
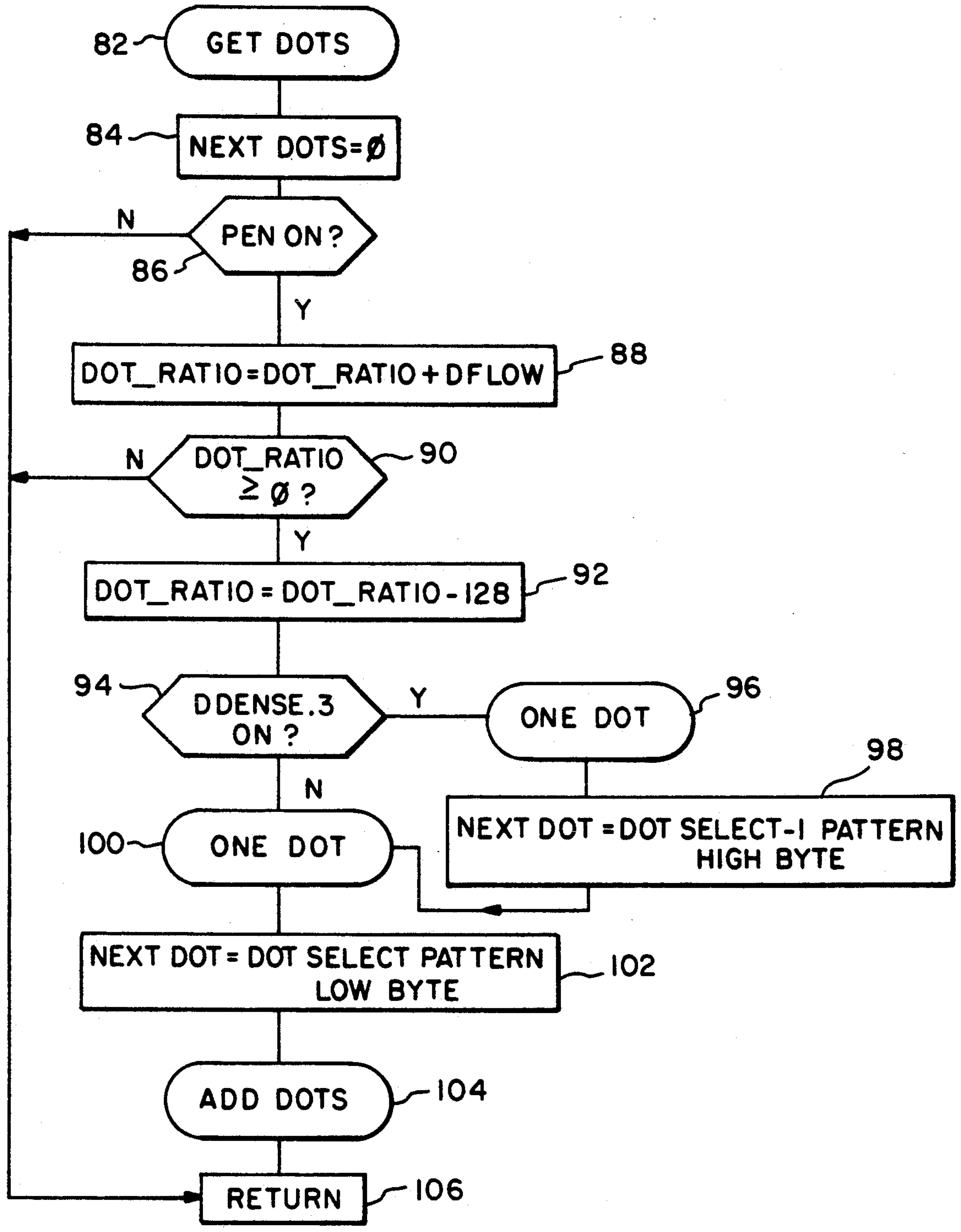

The above-described method is illustrated in the flowchart shown in FIGS. 3A and 3B. First, for each line segment, in a conventional subroutine called GONOW for setting the next line segment motion of the carriage and medium at 50, the value of RATIO is calculated as seen in FIG. 3A. First the program determines for a particular line segment whether that line segment has more steps in the X axis direction or in the Y axis direction at 52. If there are more steps in the X axis direction, the X axis is designated the major axis, and the flag variable NFASTAX is assigned the value of one at 54. If there are more steps in the Y axis direction, then Y is the major axis and NFASTAX is assigned the value of zero at 56. The value of RATIO is then computed at 58 instead of 60.

These two values—NFASTAX and RATIO—are then provided to the subroutine GETDF at 62, which calculates the dot flow versus step ratio, DFLOW (NDFLOW).

GETDF first checks that the system is in plot mode at 64 and that the next pen is on (meaning that ink output is requested by the host for the next line segment) at 66. If the major axis is the Y axis at 68, then the number for the full plot density is obtained from table YDFTABLE at 70. If the X axis is the major axis, then the number is obtained from table XDFTABLE at 72. The value AB obtained from table YDFTABLE or XDFTABLE is then multiplied by a number obtained from a third table, DDTABLE at 74, which represents the dot density as specified externally.

The resulting product is divided by two and is the value of NDFLOW at 74. The program then checks to see if the pen (i.e., ink supply) is off at 76; if not, because plotting is still in progress, the program exits; if yes, then a new series of continuous line segments is being initiated and so DOT-RATIO is set equal to $-(\text{NDFLOW}+\frac{1}{2})$ at 78 so as always to overflow the accumulator on the first cycle.

Tables YDFTABLE and XDFTABLE are lookup tables that save calculations of the relevant trigonometric functions. For each table, the independent variable is the value of RATIO. For YDFTABLE, the dependent variable is, in the preferred embodiment, equal to:

128/cos (arc tan (((RATIO+1)/256) * HSTIN/VSTIN))) where HSTIN is the number of horizontal steps per inch taken by the stepper motor moving the paper and VSTIN is the number of steps per inch for the stepper motor moving the carriage. The value of 128 is chosen because it is one half of the maximum value of RATIO.

For table XDFTABLE, the dependent variable is equal to:

128 * (HSTIN/VSTIN)/COS(ARCTAN (((RATIO+1)/256) * VSTIN/HSTIN))).

To give an example of the results of the calculations, a value of 128 for the dot flow will result in one dot of ink plotted for each step taken on the major axis. Since the steps in the example given above are closer together on the minor axis, only 56 dots are plotted on the minor axis for each 128 steps taken on the minor axis in order to obtain maximum ink density. The calculation is: 128 steps * ((276 steps/inch)/(630 steps/inch)) equals 56. Thus the average dot spacing on both the major and minor axes will be equal.

The plotting of dots is controlled by the program as shown in the second part of the flowchart by the subroutine GETDOTS whose purpose is to set up the ink dot pattern (i.e., determining which nozzles on the print cartridge will print at a particular step.) GETDOTS is called by another subroutine, NEXTPLOT, which is a conventional plotting subroutine for one step of the carriage and/or paper motion and inking.

In GETDOTS at 82, as seen in FIG. 3B, first the variable NEXTDOTS is cleared (i.e., set to equal zero) at 84. Then the program checks to see that pen is on at 86. If the pen is off, GETDOTS is exited at RETURN at 106; otherwise, the value of DFLOW (dot flow) is added to the value of DOT-RATIO at 88. Note that DOT-RATIO is an input variable provided by the previous subroutine GETDF. If there is no overflow at 90 (i.e., no carry) in DOT-RATIO, then the subroutine is exited at 106. If there is an overflow, then 128 is subtracted from DOT-RATIO at 92. Then the pattern for the dots to be printed is put into variable NEXTDOTS, as follows.

If the double dot flag (DDENSE.3) is on at 96, then subroutine ONEDOT is called at 96 and ONEDOT puts the dot pattern for dot number DOT-SELECT-1 in the high byte of the variable NEXTDOTS at 98. ONEDOT is a conventional subroutine for determining the dot pattern, which means determining what signals will be provided to the print cartridge to fire a particular nozzle. Then ONEDOT is called at 100 and ONEDOT puts the pattern for dot number DOT-SELECT in the low byte of the NEXTDOTS at 102.

Then subroutine ADDDOTS at 104 is (optionally) called to add the number of dots to be plotted to the dot total kept in ADDDOTS.

The actual plotting is then performed conventionally using variable NEXTDOTS as determined above.

The above described flowchart illustrates the program in assembly language of the preferred embodiment of the present invention as shown in FIGS. 4A, 4B and 4C, which show the subroutines GETDOTS, GETDF, and tables YDFTABLE, XDFTABLE, and DDTABLE, with accompanying comments.

The above described embodiments of the present invention are illustrative and not limiting. For instance, a program controlling the printer could be resident in a host computer system or instrumentation, and need not be in the printer The control program need not include the same subroutines, variables, or order of steps as described in the preferred embodiment. The control means need not even be wholly or partly a computer program.

I claim:

1. A method for generating a line of dots to produce a line segment having a constant average dot spacing at any angular orientation on a medium, the method comprising the steps of:

providing printing means for plotting dots of a fixed size;

moving the printing means in increments of a first constant length in a first direction and in increments of a second constant length in a second direction perpendicular to the first direction on the medium;

computing a line density value based on the angular orientation of the line segment; and plotting the dots with the printing means using the computed line density value to produce the line segment having the constant average dot spacing.

2. The method of claim 1, wherein the step of computing a constant average spacing includes computing a ratio of the number of increments of the printing means to plot the line segment in the first direction to the number of increments of the printing means to plot the line segment in the second direction.

3. The method of claim 1, wherein the step of computing the constant average spacing comprises calculating a trigonometric function of the line segment.

4. The method of claim 1 wherein the step of moving in the first direction is under the control of a stepper motor.

5. The method of claim 4, wherein the printing means comprises an ink jet print cartridge.

6. The method of claim 1, further comprising the step of plotting all segments of a plotted line.

7. The method of claim 1, wherein the step of moving comprises moving the printing means a first number of increments per unit length in the first direction, and a second number of increments per unit length in the second direction.

8. The method of claim 1, further comprising the steps, prior to the step of plotting, of:

providing a desired dot density; and multiplying the constant average spacing by the desired dot density, the resulting value being the constant average spacing for the step of plotting.

9. A plotter for generating a line of dots to produce a line segment having a constant average dot spacing at any angular orientation on a medium the plotter comprising:

plotting means for plotting dots of fixed size on the medium;

moving means for moving the plotting means in increments of a first constant length in a first direction and in increments of a second constant length in a second direction perpendicular to the first direction of the medium;

computing means for computing a line density value based on the angular orientation of the line segment; and control means for controlling the plotting means and moving means so as to plot the dots using the computed line density value to produce a line segment having the constant average dot spacing.

10. The device of claim 9, wherein the computing means computes the constant average spacing by determining a ratio of the number of increments the printing means moves to plot the line segment in the first direction to the number of increments the printing means moves to plot the line segment in the second direction.

11. The device of claim 9, wherein the control means comprises a microcontroller.

12. The device of claim 9, wherein the computing means comprises a computer program.

13. The device of claim 12, wherein the computer program comprises an assembly language program.

14. The device of claim 9, wherein the means for computing the constant average spacing further includes means for calculating a trigonometric function of the line segment.

15. The device of claim 9, wherein the moving means comprises a stepper motor for moving in the first direction.

16. The device of claim 15, wherein the printing means comprises an ink jet print cartridge.

17. The device of claim 9, wherein the control means further includes means for plotting all segments of the plotted line.

18. The device of claim 9, wherein the moving means moves the printing means a first number of increments per unit length in the first direction, and a second number of increments per unit length in the second direction.

19. The device of claim 9, wherein the computing means for computing the constant average spacing includes means for calculating the ratio of the number of increments per unit length moved by the printing means in the first direction to the number of increments per unit length moved by the printing means in the second direction.

20. The device of claim 9, wherein the control means further includes:

means for providing a desired dot density; and means for multiplying the constant average spacing by the desired dot density, the resulting value being the constant average spacing.

21. A method for generating a line of dots to produce a line segment having a constant average dot spacing at any angular orientation on a medium, the method comprising the steps of:

providing printing means for plotting the dots to form the line segment, each dot having a fixed size;

moving the printing means in increments of a first constant length in a first direction and in increments of a second constant length in a second direction perpendicular to the first direction on the medium;

computing a ratio of the number of increments in the first direction to the number of increments in the second direction to plot the line segment;

computing a line density value as a function of the computed ratio and the angular orientation of said line segment;

computing a dot flow rate as a function of the line density value and a requested dot density value; and plotting the line segment with the printing means as a function of the dot flow rate, the dots having the constant average dot spacing over the length of the line segment.

22. A plotter for generating a line of dots to produce a line segment having a constant average dot spacing at any angular orientation on a medium, the plotter comprising:

plotting means for plotting the dots to form the line segment on the medium, the plotting means capable of receiving a dot density value from a computer;

moving means for moving the plotting means in increments of a first constant length in a first direction and in increments of a second constant length in a second direction perpendicular to the first direction on the medium;

means for computing a ratio of the number of increments in the first direction to the number of increments in the second direction to plot the line segment;

means for computing a line density value as a function of the computed ratio and the angle of the line segment;

means for computing a dot flow rate as a function of the line density value and a requested dot density value; and control means responsive to the dot flow rate for controlling said plotting means and moving means for plotting the dots forming the line segment so as to maintain the constant average dot spacing over the length of the line segment.

* * * * *